Patented Feb. 9, 1937

2,069,740

UNITED STATES PATENT OFFICE

2,069,740

MONOAZO DYESTUFFS

Richard Fleischhauer, Frankfort-on-the-Main, Fechenheim, and Carl Theo Schultis, Bergen, near Hanau-on-the-Main, Germany, assignors to General Aniline Works, Inc., New York, N. Y., a corporation of Delaware No Drawing. Application May 5, 1936, Serial No. 77,992. In Germany May 9, 1935

4 Claims. (Cl. 260—92)

The present invention relates to valuable new monoazo dyestuffs, more particularly to those of the general formula:

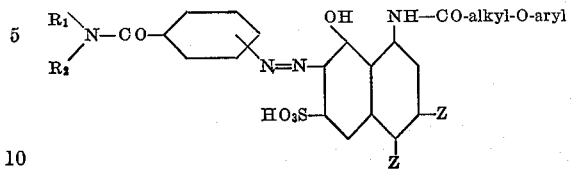

wherein $R_1$ and $R_2$ stand for a member of the group consisting of an aliphatic, cycloaliphatic, phenyl, naphthyl and benzyl radicle or $R_1$ and $R_2$ form with N a heterocyclic ring, one of the Z's stands for hydrogen and the other one for a sulfonic acid group, and aryl means a radicle of the benzene or naphthalene series. The new dyestuffs are obtained by combining the diazo compounds of aromatic amines of the following formula:

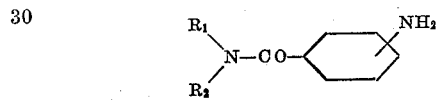

(wherein $R_1$ and $R_2$ have the above said signification) with acylated derivatives of peri-amino-naphthol-disulfonic acids containing the radical of an aryloxy fatty acid.

Diazo components of the above species have been already combined with a benzoylamino-naphthol-disulfonic acid (see U. S. A. Patent No. 1,113,622). The present new dyestuffs are distinguished in a surprising manner from those products by better fastness to perspiration besides very good fastness to fulling. Moreover the new products yield substantially more yellowish and very clear red shades of good fastness to washing, fulling and light, which shades are required by the dyers in many cases.

The diazo components used for the present process may be obtained for example by condensing the corresponding secondary amines with a nitrobenzoyl chloride which may contain further substituents in its benzene nucleus, and by reducing the condensation products obtained.

In order to further illustrate our invention the following examples are given, the parts being by weight and all temperatures in centigrade degrees; but we wish it however to be understood that our invention is not limited to the examples given, nor to the exact conditions stated therein.

Example 1

29 parts of p-amino-benzoyl-ethyl-α-naphthylamine are diazotized in the usual manner. The diazo solution obtained is allowed to run into a solution of 49 parts of 1-(2'-chlorophenoxyacetylamino)-8-naphthol-4,6-disulfonic acid containing an excess of sodium carbonate. When the combination is complete the dyestuff formed of the following formula:

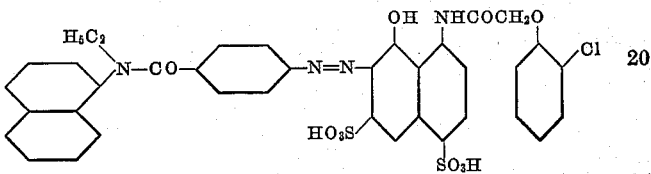

is isolated and dried. It forms a red powder, soluble in water, dyeing wool and silk very bright red shades of excellent fastness to washing and very good fastness to perspiration and light.

By employing m-aminobenzoyl-ethyl-α-naphthylamine in the above example bright scarlet shades of equal properties are obtained. By employing as combining components 1-phenoxyacetylamino-8-naphthol-4,6-disulfonic acid or substituted derivatives thereof containing in the phenoxy residue other substituents such as for example one or more methyl, methoxy or nitro groups or several halogen atoms, dyestuffs are obtained of somewhat different shades, but of equal good fastness properties.

In an analogous manner the residues of other aryloxy fatty acids such as for example phenoxypropionic acid, naphthoxy-acetic acids and substituted derivatives thereof may be introduced into the molecule of the combining components.

Example 2

A diazo solution prepared in the usual manner by starting from 30 parts of p-aminobenzoyl-dicyclohexyl-amine is combined with the solution of 49 parts of 1-(2'-chloro-phenoxyacetyl-amino)-8-naphthol-4,6-disulfonic acid in the presence of sodium carbonate. The dyestuff formed of the following formula:

[Structural formula of dyestuff showing dicyclohexylmethyl-amine coupled through N-CO-phenyl-N=N- to naphthol-disulfonic acid with NHCOCH₂O-chlorophenyl group]

is isolated and dried. It is a red powder, soluble in water with a red color and dyeing wool or silk bright red shades of very good fastness to fulling, light and perspiration. By employing the corresponding m- or o-amino compounds instead of the p-amino-benzoyl compound, dyeings of equal fastness, but more yellowish red shades, are obtained.

Similar red dyestuffs of likewise very good fastness properties are obtained by replacing the above said diazo components for example by the corresponding amounts of amino-benzoyl-cyclohexyl-phenyl-amines, amino-benzoyl - diphenylamines, amino - benzoyl - benzyl - phenylamines, amino-benzoyl-carbazoles and other amino compounds of similar constitution.

Example 3

24,8 parts of p-aminobenzoyl-di-n-butylamine are diazotized in the usual manner. The diazo solution obtained is allowed to run into a solution of 49 parts of 1-(2'-chloro-phenoxyacetylamino) - 8 - naphthol - 4,6 - disulfonic acid containing an excess of sodium carbonate. The dyestuff formed of the formula:

[Structural formula]

is isolated and dried. It forms a red powder, soluble in water, dyeing wool bright red shades of very good fastness to fulling, light and perspiration.

A dyestuff of likewise bright more yellowish shades and similar fastness properties is obtained by starting from m-aminobenzoyl-di-n-butylamine.

By employing 1-phenoxyacetylamino-8-naphthol-3,6-disulfonic acid or the derivatives thereof dyestuffs of more bluish shades are obtained.

The above said diazo components may be replaced with corresponding success for example by aminobenzoyl-n-butyl-o-toluidine, aminobenzoyl-di-isobutylamine, aminobenzoyl-methyl-isohexylamine, aminobenzoyl-methyl-isoamylamine, 3-amino-4-methyl-benzoyl-di-cyclohexyl-amine, 2-chloro-5-amino-benzoyl-di-(n-butyl)-amine and similar compounds.

Example 4

24,8 parts of m-aminobenzoyl-di-n-butylamine are diazotized in the usual manner. The diazo solution obtained is allowed to run into a solution of 47 parts of 1-(2'-methyl-phenoxyacetylamino)-8-naphthol-4,6-disulfonic acid containing an excess of sodium carbonate. The dyestuff formed of the formula:

[Structural formula]

is isolated and dried. It forms a red powder, soluble in water, dyeing wool and silk bright red shades of very good fastness to washing, fulling, light, perspiration and sea-water.

A dyestuff of similar properties is obtained by employing 1-(4'-methyl-phenoxyacetylamino-8-naphthol-4,6-disulfonic acid.

Example 5

30,2 parts of p-aminobenzoyl-N-benzylaniline are diazotized in the usual manner and combined with 47 parts of 1-(4'-methyl-phenoxy-acetylamino)-8-naphthol-4,6-disulfonic acid in the presence of sodium carbonate. The dyestuff obtained of the formula:

[Structural formula]

is isolated and dried. It forms a red powder, soluble in water with a red color, dyeing wool and silk very clear red shades of very good fastness to washing, light and perspiration.

A dyestuff of similar properties is obtained by employing 1-(2'-methyl - phenoxyacetylamino) - 8-naphthol-4,6-disulfonic acid.

Example 6

28,6 parts of p-aminobenzoyl-carbazole are diazotized in the usual manner and combined with 49 parts of 1-(2'-chlorophenoxyacetylamino)-8-naphthol-4, 6-disulfonic acid in the presence of sodium carbonate. The dyestuff formed of the formula:

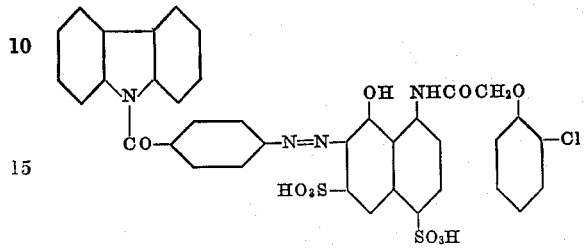

is isolated and dried. It forms a red powder, soluble in water with a red color, dyeing wool and silk very bright red shades of very good fastness to washing, light and perspiration.

Example 7

30 parts of m-aminobenzoyl-dicyclo-hexylamine are diazotized in the usual manner. The diazo solution obtained is allowed to run into a solution of 49 parts of 1-(2'-chloro-phenoxyacetylamino)-8-naphthol-3,6-disulfonic acid containing an excess of sodium carbonate. When the combination is complete the dyestuff formed of the formula:

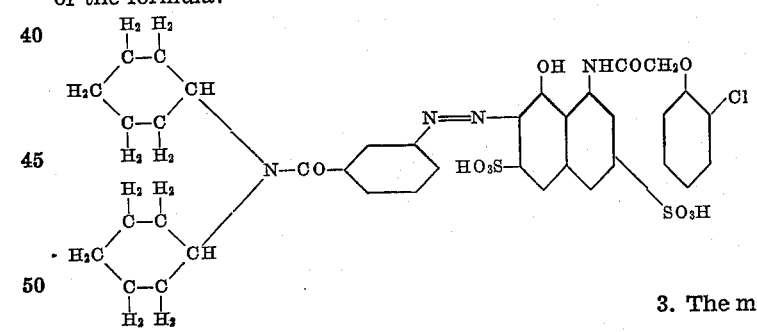

is isolated and dried. It forms a red powder, soluble in water with a red color, dyeing wool and silk bright red shades, fast to fulling, light and perspiration.

We claim:

1. The monoazo dyestuffs of the general formula:

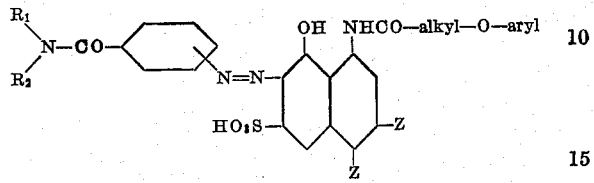

wherein $R_1$ and $R_2$ stand for a member of the group consisting of an aliphatic, cycloaliphatic, phenyl, naphthyl and benzyl radical or $R_1$ and $R_2$ form with N a heterocyclic ring, one of the Z's stands for hydrogen and the other one for a sulfonic acid group, and aryl means a radicle of the group consisting of the radicals of benzene and naphthalene series, which dyestuffs yield on fibers, especially wool or silk, bright red shades of very good fastness to washing, fulling, light and perspiration.

2. The mono azo dyestuff of the formula:

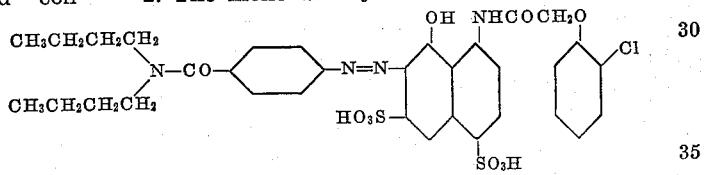

which dyestuff represents a red powder, soluble in water, dyeing wool bright red shades of very good fastness to fulling, light and perspiration.

3. The mono azo dyestuff of the formula:

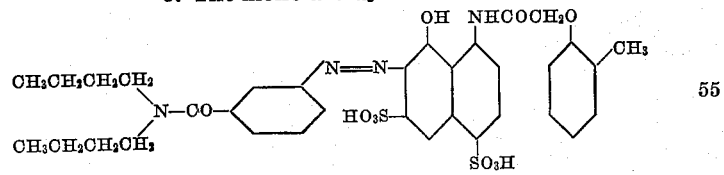

which dyestuff represents a red powder, soluble in water, dyeing wool and silk bright red shades of very good fastness to washing, fulling, light, perspiration and sea-water.

4. The mono azo dyestuff of the formula:

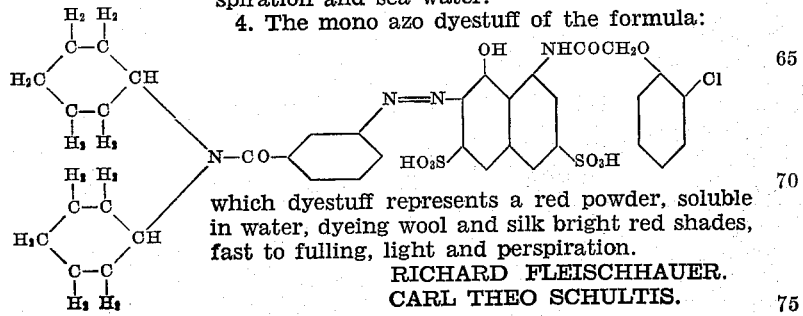

which dyestuff represents a red powder, soluble in water, dyeing wool and silk bright red shades, fast to fulling, light and perspiration.

RICHARD FLEISCHHAUER.
CARL THEO SCHULTIS.